C. E. DAMPIER.
Weighing Machine.
No. 1,974. Patented Feb. 12, 1841.
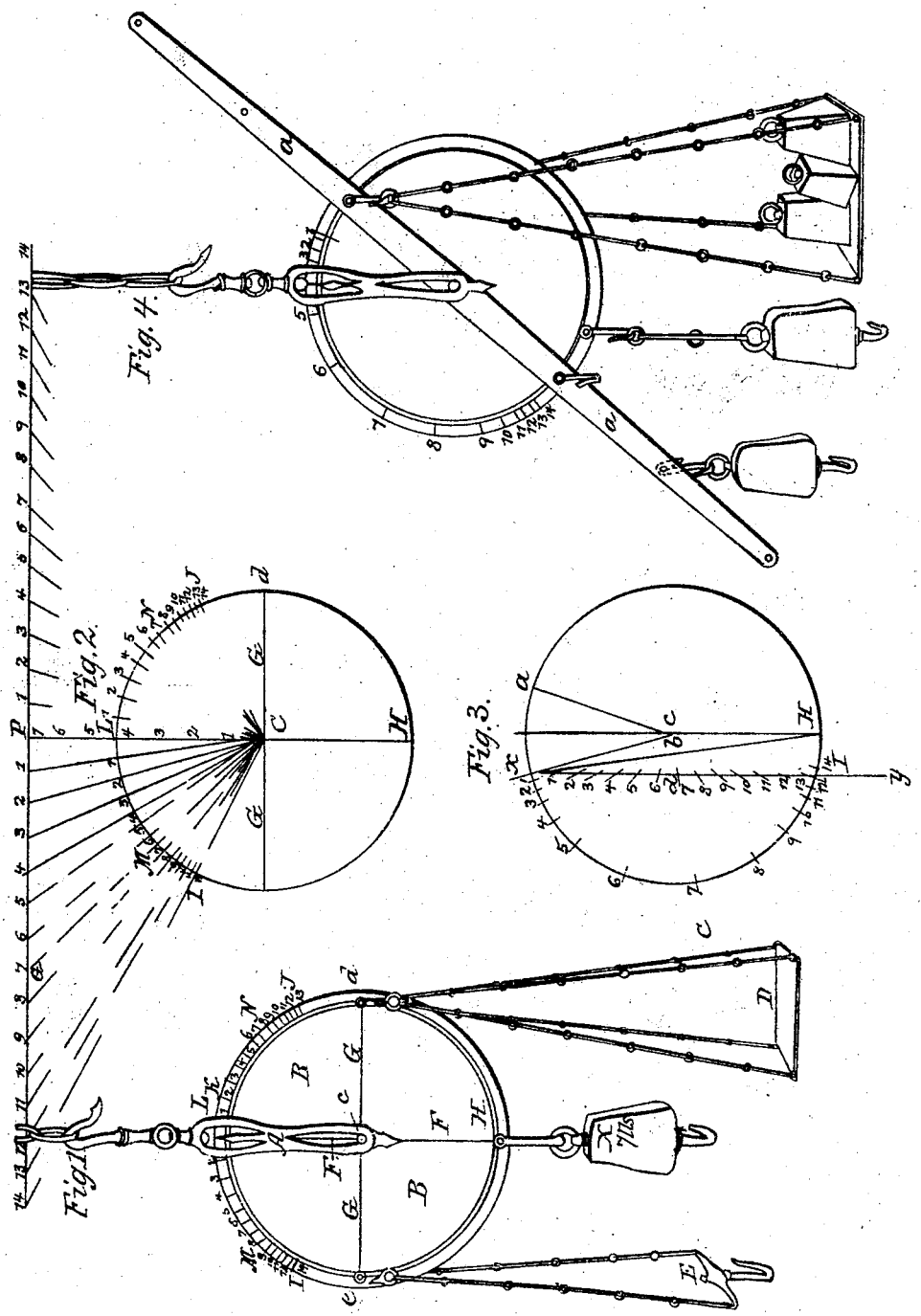

UNITED STATES PATENT OFFICE.

CHRISTOPHER EDWARD DAMPIER, OF WARE, ENGLAND.

METHOD OF CONSTRUCTING WEIGHING APPARATUS.

Specification of Letters Patent No. 1,974, dated February 12, 1841; Antedated January 14, 1840.

*To all whom it may concern:*

Be it known that I, CHRISTOPHER EDWARD DAMPIER, of Ware, in the county of Herts, in that part of the United Kingdom of Great Britain and Ireland called England, have invented an Improved Weighing-Machine, of which the following is a full and exact description, reference being had to the drawings hereunto annexed and referred to—that is to say:

The nature of the said invention consists in a circular plate or disk acting at the same time as a crank or bent lever, and an equipoised balance beam (to which the substances required to be weighed and one given weight are attached) and as a geometric graduated scale of parts or subdivisions of such given weight for indicating the weight of matter applied thereto when compared or balanced with or against the said given weight and in the application to such circular plate disk or bent lever of the simple lever or steel yard in combination with such bent lever and graduated scale for extending the power and operation of the same beyond such weights as should be indicated on the disk. And the manner in which the said invention is to be performed is described by the following statement thereof.

*Description of the drawing.*—Figure 1 represents a front view of one of the improved weighing machines. A is a suspended frame to support the disk or circular plate B, which disk turns upon an axis or center at C resting on the frame A in bearings for the purpose; D is the weighing scale suspended at the point $d$ on the disk to receive the substance or matter to be weighed, E is a balance weight or hook being on the opposite side of the disk at a point $e$ to counterpoise the weighing scale. F F is a perpendicular line marked on the disk from the point H through the center, and G G is a line likewise marked on the disk from the point $d$ to the point $e$, likewise through the center, such line being in this figure a horizontal line. At H is hung the weight X before referred to which is called the resisting multiple weight and care must be taken that the disk be equipoised on its axis and that the points $d, e,$ and H are all equidistant from the center of the disk. From L to I is the geometric scale before mentioned applicable to the matter if applied to the weighing scale and from L to J is the geometric scale applicable to the matter if applied to the hook E both such geometric scales being marked on the disk and K is an index fixed to the suspended frame A to mark the weights sought as the disk revolves and as the zero (to which the index is in the first instance to be set) of the scale is propelled from its original position by the weight of matter placed in the weighing scale or on the hook as hereinbefore mentioned.

Fig. 2 is the geometric figure by which the scale should be formed when, as in Fig. 1, the angle of the bent lever described by lines drawn from the center to the points $d$, and H respectively is a right angle, and such points equidistant from the center describe a circle as in this figure and from the point H (corresponding with that point or extremity of the bent lever in Fig. 1 at which the resisting multiple weight is suspended) draw through the center C the perpendicular line H C L (corresponding with the perpendicular line described in Fig. 1). Through the center also and from the point $d$ to the point $e$ (corresponding with the points in Fig. 1 at which the weighing scale and hook are suspended) draw the horizontal line G G produce the radius C L and set off from the center C upon such radius or line as many equal parts as the given resisting multiple weight is commonly held to contain of subdivisions which it is intended should be indicated by graduation on the scale and at the extremity P of such line and parts so set off draw the horizontal line Q, P, Q′, and set off on that line from the point P in each direction the same number of like equal parts which are set off from the center upon the line C P, as before mentioned. Draw a line from each such point of division to the center and the two several arcs L M and L N (which correspond with the arcs L M and L N respectively on the disk in Fig. 1) will be thereby respectively divided into as many parts as the given resisting multiple weight contains of such required subdivisions as aforesaid and such several divisions or graduated distances will correspond with the several required parts or subdivisions of the given resisting multiple weights and being carefully transferred to the disk and successively enumerated as from L the zero of the scale (to which the index must previously be set) they will severally denote the weight of any matter applied to the weighing scale or hook as exhibited to the index when such substance is balanced against the resisting multiple weight by the operation of this machine. The lines P, Q, P Q being produced and other similar parts at like equal distances being further set off thereon and lines drawn in like manner from each of the points so formed to the center, the arcs M I and N J will be in like manner intersected by a second series of lines of graduation which being also transferred to the disk will indicate in like manner such various further parts successively multiple of the original unit, or subdivisional part of the given or resisting multiple weight as required.

Fig. 3 is the geometric figure by which the scale should be formed when the angle of the bent lever described by lines drawn from the center to the points corresponding with the extremities of the bent lever or points of suspension hereinbefore mentioned is other than a right angle or are not equidistant from the center as in the last figure. Dsecribe a circle as in this figure. From the center C let fall the perpendicular line C H (the point H corresponding with that in Fig. 1, at which the resisting multiple weight is suspended) let the point $d$ correspond with the point in Fig. 1 at which the weighing scale is suspended and the angle $d$ C H with the angle of the proposed bent lever. Describe the angle H C $x$ equal to the angle H C $d$ and let the line H C and C $x$ be equal to the lines H C and C $d$ respectively. Draw line from $x$ to H which line divide into two equal parts and from the center C through such point of division or bisection $b$ draw the line C $b$ $c$. From the point $x$ parallel with the line H C let fall the perpendicular line $x$ $y$, intersecting the line C $c$ at the point $d$, divide the line $x$ $d$ into as many equal parts as the given or resisting multiple weight contains of parts as before mentioned. Draw lines from the center to the circumference of the circle through every such point of division and the arc $x$ $c$ will be thereby divided into any many parts as the given resisting multiple weight contains of subdivisions which it is intended to indicate on the scale as aforesaid and the various graduated distances so ascertained will correspond with the various subdivided parts of the given resisting multiple weight and being carefully transferred to the disk and successively enumerated from $x$ the zero of such graduated scale (to which the index must previously be set) they will severally denote the weight of any matter applied to the weighing scale suspended at the point $d$ as they are severally exhibited to the index when such matter is balanced against the said resisting multiple weight. In order to extend this graduated scale set off from the point $d$ on the line $d$, $y$, as many further parts likewise equal to those into which the line $x$ $d$ is divided as it is desired further to graduate on the disk and draw lines from the center to the arc $C$ $f$ of the circle through or to every such further point of division and the arc so intersected will be thereby divided into such further parts or graduations as required and such further scale being in like manner transferred to the disk will by exhibition to the index when the matter is balanced against the given or resisting multiple weight denote such further weight as desired. The machine herein described may be used for ascertaining greater or less weights than those marked on the disk by removing and replacing the given resisting or multiple with or by another of proportionate greater or less gravity, in the former of which cases the weight denoted by the scale and index when the matter is balanced must in like manner and in like proportion be multiplied and in the latter case in like manner and in like proportion divided in order to denote the actual weight of the matter proposed to be weighed by such means. The machine may also be used for ascertaining greater weights than those graduated on the disk by suspending at the counterpoise hook or scale other weights to any extent which may be required to balance such matter and which weights so suspended must in that case be added to the weight shown by the graduated scale in order to denote the true and actual weight of the matter so weighed.

Fig. 4 is another of my improved weighing machines with the angle of the bent lever obtuse as in Fig. 3 constructed on the principle above mentioned acting in combination with the simple lever or steel yard which simple lever or steel yard $a$, $a$, as described in this figure is a fixed or temporary straight steel or other beam consisting of two parts affixed to the disk such two parts being of equal length substance and gravity equally counterpoising each other and working upon the same center as that on which the disk revolves such center being or acting as the fulcrum of its movement and which said steel beam is graduated from the center into equal distances such several distances or parts being successively multiple of the distance or part of the disk between the center and the point at which the weighing scale or hook is suspended. The purpose of which steel beam is to add to the operation of the disk or bent lever any proposed further weight than this marked or graduated upon the disk in the way of balance upon such steel yard which additional weight or the multiple thereof according to its position upon the steel yard being added to that shown upon the disk or bent lever by the index will give the true weight of the matter balanced.

Now whereas I claim as my invention—

1. The application of a geometric scale formed on the principle of the rules hereinbefore given to a circular plate or disk such plate or disk acting at the same time as a bent lever and an equipoised balance beam for weighing matter in manner hereinbefore described and as an index of the weight so ascertained as shown by the figures in the drawings annexed.

2. And I claim also as my invention the combination in operation of the aforesaid disk acting as a bent lever and the simple lever or steel yard *a* hereinbefore described for ascertaining the weight of substances applied thereto by means of graduated scales as hereinbefore mentioned extending the operation of the disk acting as a bent lever to greater weights than marked upon the disk by means of the simple lever or common steel yard.

CHRIS. EDW. DAMPIER.

Witnesses:
 JOHN FER. HUGHES,
 J. C. ROBERTSON.